No. 881,648.
PATENTED MAR. 10, 1908.
M. O. ANTHONY.
COOKING AND HEAT RETAINING APPARATUS.
APPLICATION FILED SEPT. 22, 1906.
2 SHEETS—SHEET 1.
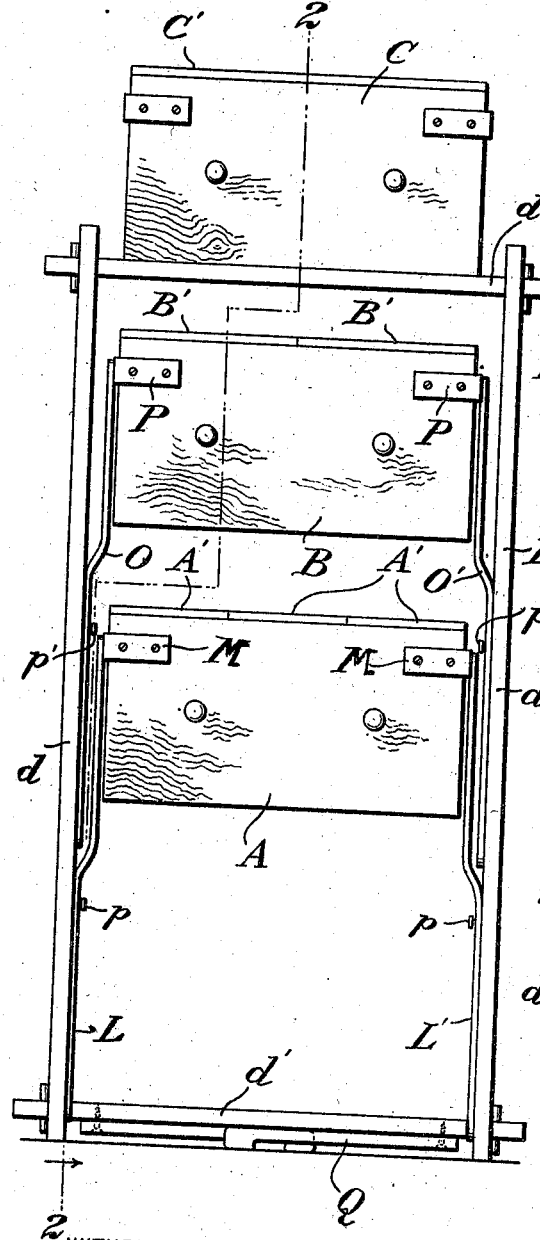
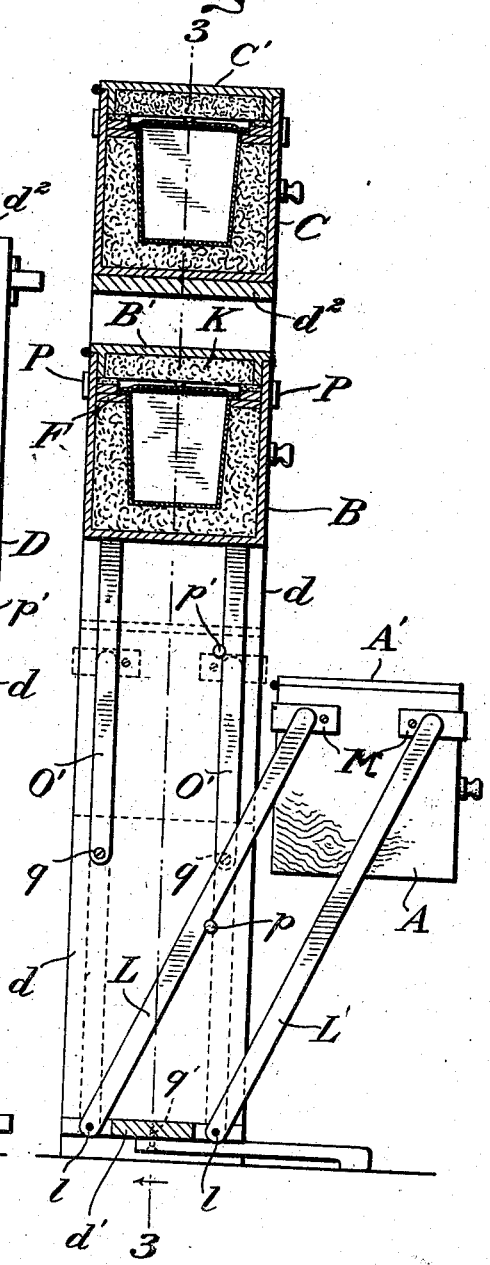
WITNESSES
W. C. Abbott
V. E. Nichols
INVENTOR
Marcus O. Anthony
BY
Griffin & Bernhard
ATTORNEYS

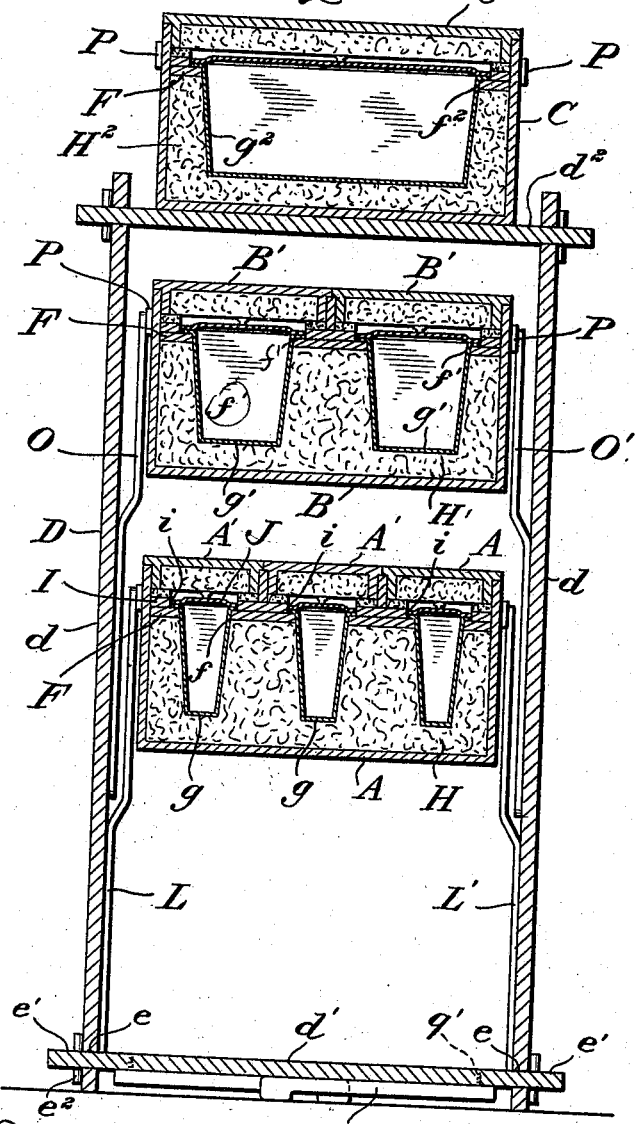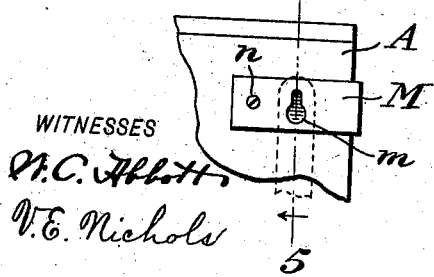

UNITED STATES PATENT OFFICE.

MARCUS O. ANTHONY, OF NEW YORK, N. Y.

COOKING AND HEAT-RETAINING APPARATUS.

No. 881,648.  Specification of Letters Patent.  Patented March 10, 1908.

Application filed September 22, 1906. Serial No. 335,741.

*To all whom it may concern:*

Be it known that I, MARCUS O. ANTHONY, a citizen of the United States, residing in the city of New York, borough of Manhattan, county of New York, and State of New York, have invented a certain new and useful Cooking and Heat-Retaining Apparatus, of which the following is a specification.

This invention is a cooking and heat retaining apparatus, and the object in view is to provide a device of compact and economical construction whereby a large amount of material may be cooked, and, after cooking, retained in a heated condition.

Heretofore it has been proposed to provide a device whereby an individual container, the contents of which having been once heated to a required temperature, might be protected in such manner as to prevent the radiation of heat from said container, but experience has proved that it is impracticable to employ a number of such containers individually.

By my invention I am enabled to accomplish all the advantages incident to employing a large number of individual containers, but in a more feasible and economical manner in so far as the quantity of non-conducting material employed is concerned; further, because my apparatus employs much less space than the individual containers would, and, also, is devoid of the many obvious and manifest disadvantages incident to the employment of individual containers.

In the drawings I have shown one embodiment of the invention, but the construction shown therein is to be understood as illustrative, only, and not as defining the limits of the invention.

In said drawings, Figure 1 is a front elevation of a cooking and heat retaining apparatus constructed in accordance with this invention; Fig. 2 is a vertical section taken in the plane indicated by the irregular dotted line 2—2 of Fig. 1, looking in the direction of the arrow; Fig. 3 is a vertical section on the line 3—3 of Fig. 2, looking in the direction of the arrow; Fig. 4 is a detail view of a portion of one of the casings, showing a corner plate and the slot therein adapted for the reception of a pivotal pin, and Fig. 5 is a vertical section on the line 5—5 of Fig. 4.

The apparatus of this invention contemplates the employment of a plurality of casings, three of which are indicated at A, B, C, in the drawings, but it is to be understood that I may employ a single casing, or I may use only two casings, or I may increase the number of casings according to the desired capacity of the apparatus. The casings, or some of them, are supported movably on a frame or stand D. Said frame may be of any suitable or appropriate construction, but in the drawings it is shown as of "knockdown" construction. It consists of a plurality of uprights $d$, a bottom piece $d'$, and a top piece $d^2$. The side pieces $d$ $d$, are provided with openings or slots $e$, and the top and bottom pieces $d'$, $d^2$, are shouldered to produce tenons $e'$, the latter extending through the slots or openings $e$, and receiving wedges or keys $e^2$. Said wedges are adapted to be tightened in the tenons $e'$, and to bind against the side pieces $d$, whereby the several parts of the frame D may be drawn together tightly for the purpose of producing a rigid structure. It is evident that the wedges or keys $e^2$, may be removed, and the sides $d$ separated from the top and bottom $d'$, $d^2$, thus enabling the entire frame to be collapsed and folded within a small space. It is preferred to construct the several casings A, B, C, to receive quite a number of cooking pots or vessels, and for this purpose I have shown the casing A as being provided with three pockets or chambers, the casing B as having two pockets or receptacles, each of which is somewhat larger than the individual receptacles of the casing A, whereas the casing C is shown as having a single pocket of larger capacity than the pockets of either casings A or B. This detailed construction of the several casings may be modified or changed at pleasure. As shown, each casing A, B, C, is provided with a false top or horizontal partition F, the same being secured firmly in place near the upper portion of the casing. This false top or partition of the casing A is provided with openings $f$, in which are secured suitable receptacles $g$, the latter being made preferably of metal. The casing A is shown as having three of these receptacles $g$, and said receptacles are surrounded or enveloped, practically, by non-conducting material H, the latter completely filling the casing A between its bottom and the false top F. As shown, the partition F of the casing B is provided with two openings $f'$, in which are secured the upper edges of the receptacles $g'$, and these receptacles are practically surrounded or enveloped by the non-conducting material H'. The remaining casing C of the apparatus shown is provided with a single opening $f^2$ in the partition F, in which opening is secured the edge portion of a single receptacle $g^2$, the latter being embedded in, and practically enveloped by, the non-conducting material $H^2$, all as clearly shown by Fig. 3 of the drawings. The several receptacles $g, g', g^2$, form integral or permanent parts of the casings A, B, C, and each receptacle is adapted to receive a cooking pot, vessel, or other culinary article, for the purpose of retaining the heat which may have been imparted thereto, and of completing the operation of cooking the material by the latent heat of the contents of the vessel. As shown, each casing is provided with an additional partition I, which is placed directly upon the partition F, and this partition I is provided with one or more openings $i$, the same being directly over the openings $f$, or $f'$, or $f^2$, in the partition F. The opening $i$ in each partition I is somewhat larger than the corresponding opening of the partition F, and in each opening $i$ of the partition I is placed a cover J, of the cooking vessel, or other culinary article.

The receptacles $g, g', g^2$, of the several casings, are closed by individual covers. The casing C is provided with a single cover C', the casing B has two covers B', arranged to be independently operated for the purpose of obtaining access to the receptacles $g'$, whereas the casing A is shown as having three covers A', adapted to close the individual receptacles $g$. As shown, each cover is hinged to this casing, and said cover is chambered for the reception of non-conducting material K. As shown, the casing C of the apparatus rests upon the top piece $d^2$ of the frame, the latter serving as a shelf for said casing. The casing may be placed on the top shelf or removed at will therefrom.

For the purpose of compactly arranging the casings of my apparatus, permitting ready access to be obtained thereto when it is desired to place the cooking vessels in, or remove them, from said casings, and to arrange the casings out of the way of the housewife when they are not in use or when they are set aside for the purpose of completing the cooking operation, I arrange the casings A, B, one above the other, and support them movably within the stand of frame D. As shown, the casing A is supported by two pairs of parallel links L, L'. The links are arranged at the respective ends of the casing A, and they are pivotally supported at their lower ends by means of pins $l$, the latter being fastened to the sides $d$ of the frame D, or to the bottom piece $d'$. The upper ends of the links L, L', are connected pivotally and detachably with the casing A, near the upper corners thereof. The detailed construction of such detachable and pivotal connection between one link and the casing is shown by Figs. 4 and 5 of the drawings. The casing is provided with a corner strap or angle plate M, the same being preferably cast and secured by screws $n$ to said casing. The casing is recessed, as at $n'$, and the corner plate or strap M is provided with a slot or opening $m$, the latter being shown as a "keyhole" slot. Each link is provided at its upper end with a headed stud or pin $o$, the same being adapted to enter the slot $m$, and to be received in the recess $n'$. The two pairs of links are connected pivotally with the casing near its respective corners and at its respective ends, whereby the casing is pivotally supported on the stand or frame by the arms or links, and it is adapted to be moved bodily in an inward and outward direction relative thereto. It will be noted that the links L, L', are movable inwardly of the frame so that they may assume vertical positions, as shown by Figs. 1 and 2, and by dotted lines in Fig. 2, thus supporting the casing A, substantially within the sides $d$ of said frame. The arms or links, and the casing A, may be swung outwardly to the position shown by full lines in Fig. 2, in which position the casing is supported by the arms substantially outside of the frame, thus permitting the covers A' to be lifted and exposing the receptacles $g$. The arms are prevented from swinging too far outwardly by a suitable stop or stops $p$, each being shown as a pin or screw fastened to the sides $d$ of the frame, and said stops being in the path of two of said arms or links. The casing B is supported and operated in a similar manner as the casing A. The arms or links O, O', for said casing B are pivoted, at their lower ends, by pins or screws $q$, to the sides $d$ of the frame, and the upper ends of said arms O, O', are connected pivotally to the angle or corner plates P of said casing B, by devices constructed substantially the same as the devices shown by Figs. 4 and 5. The arms O, O', and the casing B, are prevented from swinging too far outwardly by stops $p'$, which are fastened to the sides of the frame D, and are in the path of two of the arms O.

It will be understood from the foregoing description that either of the casings, A, B, may be moved outwardly beyond the frame D, to substantially the position in which the casing A is shown by Fig. 2. Either casing is thus supported outside of the frame D for obtaining easy and quick access to the receptacles which are provided therein and are surrounded by the non-conducting material. The several covers of either casing A or B may be raised, and the cooking vessel or pot, with the heated contents thereof, may be deposited in one of the several receptacles of said casing, after which the cover J is placed in position, and the hinged cover of the casing is closed. The casing may now be shoved back within the limits of the frame D, and the apparatus may be allowed to rest or set for any desired time. The cooking vessel or pot is entirely enveloped by heat resisting material, and the heat of the material being cooked is thus retained within the casing for the purpose of keeping the food in a warm condition for quite a long period of time, and for the further purpose of completing the cooking of said material. Any desired non-conducting material may be employed in the casing or casings of my apparatus, but it is preferred to use the material known as mineral wool, the same being packed in the casing around the receptacle or receptacles therein.

It is found that the weight of the casing or casings A, B, when supported externally of the frame by the arms, has a tendency to overbalance the frame, and to cause it to tilt. To overcome this objection, I may provide the frames with one or more foldable feet Q. Said feet are shown by Figs. 1 to 3, inclusive, as being connected pivotally at $q'$, to the bottom piece $d'$ of the frame, but any desired equivalent may be employed in lieu of said feet.

Having thus described my invention, what I claim as new and desire to secure by Letters Patent is:—

1. In a device of the class described, a frame, a cooking and heat-retaining receptacle provided with a cover, and arms connected to the frame and to said receptacle for supporting the latter within said frame, said arms and the receptacle being capable of swinging outwardly from the frame, whereby the receptacle is supported beyond the frame and in a position to open its cover.

2. In a device of the class described, a frame, a cooking and heat-retaining receptacle, arms pivoted to the frame and to said receptacle, said arms and the receptacle being movable inwardly and outwardly of the frame, and means for limiting the outward swinging movement of the arms when in a position inclined upwardly and outwardly from the frame.

3. In a device of the class described, a frame, a cooking and heat-retaining receptacle and two pairs of arms, each arm being pivoted to the frame and connected pivotally and detachably to the receptacle, said arms and the receptacle being movable inwardly and outwardly relative to the frame, and said receptacle being removable from said arms.

4. In a device of the class described, a frame, a plurality of cooking and heat-retaining receptacles, and a plurality of devices for supporting the receptacles individually on the frame, each receptacle and its supporting devices being movable relative to the frame independently of the other receptacles and the respective supporting devices therefor.

5. In a device of the class described, a frame, a plurality of cooking and heat-retaining receptacles, and a plurality of arms for supporting the receptacles individually on the frame, each receptacle and its arms being movable relative to the frame independently of the other receptacles.

6. In a device of the class described, a frame, a plurality of cooking and heat-retaining receptacles, and a plurality of arms for supporting the receptacles individually on the frame, each receptacle and its arm being movable inwardly and outwardly of the frame, said movement of the receptacle being independent of the other receptacles.

7. In a device of the class described, a frame, means pivoted thereto, a casing supported and carried by said means, and non-conducting material contained within said casing.

8. In a device of the class described, a frame, two series of parallel arms pivoted thereto, and a casing supported and movable by said arms inwardly and outwardly of the frame.

9. In a device of the class described, a frame, parallel arms pivoted thereto, and a casing supported and movable by said arms, said casing being removable from said arms.

10. In a device of the class described, a frame, means secured to the casing and movable with relation thereto, a casing detachably connected to and movable by said means, a second means secured to the frame above said first mentioned means, and a second casing carried by and movable with the said second means independently of the first casing.

In testimony whereof I have signed my name to this specification, in the presence of two subscribing witnesses.

MARCUS O. ANTHONY.

Witnesses:
JAS. H. GRIFFIN,
H. I. BERNHARD.